United States Patent Office 3,140,193
Patented July 7, 1964

3,140,193
PROCESS FOR PRODUCING OXIDATION RESISTANT REFRACTORY COATING ON DENSE GRAPHITE
James S. Kane, Livermore, Calif., assignor to the United States of America as represented by the United States Atomic Energy Commission
No Drawing. Filed Apr. 6, 1960, Ser. No. 20,506
13 Claims. (Cl. 117—8)

This invention relates to oxidation resistant refractory coatings for graphite and methods for producing same. More specifically, the invention relates to a refractory oxidation resistant graphite coating comprising bonded layers of silicon carbide and silicon metal, and a method of producing same.

The invention provides a graphite coating comprising an inner porous layer of silicon carbide bonded to the graphite surface and an outer layer of silicon metal bonded to the carbide coating. Silicon metal itself is highly oxidation resistant because a protective layer of silicon oxide forms on its surface. The coating thus excludes contact of the graphite substrate with the atmosphere at temperatures up to the melting point of the silicon metal. The coating is produced by first coating or reacting the graphite surface with a primary material to form an outer layer of silicon carbide. The outermost graphite remaining at the interface which has not been carburized is then removed leaving a porous outer carbide surface. The outer porous silicon carbide surface is thereafter coated with silicon. Further invention and novelty reside in the precise steps by which the coating method is carried out.

The remarkable nuclear and physical properties of graphite make this material extremely valuable for use in high temperature nuclear reactors, as well as for use in the many electrical and other arts known in the past. Among its many desirable physical properties are its superior thermal shock resistance, high temperature strength, low coefficient of thermal expansion, high thermal conductivity and high strength-to-weight ratio. As a reactor material, graphite is a good moderator for thermalizing neutrons. It is available in quantity and in very high purity, and can be machined to high tolerances with relative ease.

Unfortunately, the high temperature chemical properties of graphite are not nearly so outstanding as the physical properties. At elevated temperatures it is attacked by oxygen, water and hydrogen, and to a more limited extent, by nitrogen. Therefore, any long life application of the material has been limited to relatively low temperatures, or to inert atmospheres. Many different types of graphite coatings are known in the various art categories in which a particular type of protection is achieved.

To protect graphite in nuclear reactors, graphite moderator blocks are frequently contained within an envelope of a non-reactive metal such as zirconium or aluminum to prevent adsorption of or reaction with the reactor coolant. However, in gas cooled reactors, and especially in mobile, lightweight, compact reactors having single piece cores, and in other uses for graphite generally, this form of construction has been disadvantageous due to bulk, low structural strength, fabrication problems and other factors. Consequently, a preferred method of protecting the graphite has been to deposit or form a layer of refractory metal carbide directly upon the graphite surface. Much effort has been expended in developing carbide coatings of zirconium, niobium and molybdenum. In general, these coatings provide satisfactory results for certain types of work, but the preparation thereof requires special techniques and, even more important, they are not resistant to oxidation. Further, these carbides are not particularly suitable for heavy duty use and tend to be thinner than might be desired for a long life in a high temperature environment.

Silicon carbide coatings on graphite are also known in the prior art, particularly with respect to work predating nuclear applications. Such coatings are adequate for many applications and, in addition, retain their quality and properties at moderate temperatures. However, in the formation of SiC coatings by the application of silicon metal to graphite with subsequent heating, the silicon penetrates into the graphite further than is generally desired. The penetration cannot be controlled by using additional metal, since with additional metal, penetration to an even greater depth is brought about. Further, the carbide surface is not completely impervious to the passage or diffusion of oxygen, so that the underlying graphite is readily oxidized or subject to attack at high temperatures or by corrosive environments.

There has now been discovered a method of preparing an intermediate bonded porous layer of silicon carbide on graphite and applying an outer layer of silicon onto the bonded silicon carbide resulting in a novel structure not having the discontinuous surface of the silicon carbide coating of the prior art. The method comprises first applying a tenacious silicon carbide coating onto graphite using a method selected from those known in the prior art. Relatively dense graphite is preferred in order to prevent extreme penetration by the coating, and to retain a relatively high concentration of the carbide near the surface. After application of the coating, the graphite piece is treated, or otherwise heated in an oxidizing atmosphere, whereby the graphite protruding through, or disposed near, the surface of the silicon carbide coating is oxidized to form carbon dioxide. There results the aforesaid intermediate porous layer in the form of a SiC honeycomb structure bonded to the graphite but having many caves and tunnels extending through the carbide. In a second coating step, molten silicon metal is applied to the carbide bonding layer for a period of time just long enough for the silicon to permeate the honeycomb structure. Further invention resides in the details of the specific method steps.

The resulting exterior coating is characteristically an outer impenetrant coating of silicon onto which a layer of oxide quickly forms, and an intermediate cotaing of the carbide, interlaced with the silicon metal, which is bonded to the carbon substrate. Because of the several bonded impenetrant layers, oxidation is prevented over extreme temperature variations, an exceptional quality not present in the coatings of the prior art.

Since silicon is very resistant to attack by oxygen, nitrogen and water, at temperatures up to its melting point, 1410° C., and since it has a low density of 2.3 g./cm.$^3$, and since it has the lowest capture cross section for thermal neutrons for any metal except Be, Mg and Bi, the coating is applicable to many nuclear embodiments. In fact, the coating described provides a solution for the containment and protective coating problems affecting many types of reactors, e.g., high temperature gas cooled nuclear reactors having graphite moderator or structural components. Further, the various coating steps are adaptable to manufacturing techniques in which graphite pieces of almost any size and shape may be coated rapidly, efficiently and with a minimum of rejects.

Accordingly, an object of the invention is to provide an impenetrant oxidation resistant graphite coating capable of withstanding temperature variations up to a temperature of about 1400° C.

A further object is to provide such a coating comprising materials which have low thermal neutron cross sections and which may be applicable for use in fabricatnig components of neutronic reactors, e.g., moderator pieces.

A further object is to provide a coating containing only the materials silicon and silicon carbide, and optionally silicon oxide, bonded to the graphite substrate.

A further object of the invention is to provide a graphite coating comprising a graphite substrate onto which is bonded a porous layer of silicon carbide, and having an outer coating of silicon metal on top of and interlaced with the carbide coat.

Another object of the invention is to provide a method of coating graphite with an adherent or tenacious coating comprising silicon carbide and silicon which is oxidation resistant at temperatures up to the melting point of silicon.

A further object of the invention is to provide a method for preparing a high temperature, oxidation resistant coating for graphite by first providing an intermediate porous layer of silicon carbide bonded to the graphite substrate and thereafter coating the silicon carbide layer with silicon metal.

Another object of the invention is to provide a method of preparing such a coating on graphite by first pretreating the graphite to impart desired properties in the final product, contacting the graphite with silicon metal which is then carburized in place to produce an even adherent carbide coating, subjecting the carbide coating to an oxidizing atmosphere at an elevated temperature whereby the outer portion of the graphite in the graphite-carbide interface is oxidized to carbon dioxide leaving a porous layer of carbide bonded to the graphite, and thereafter coating the porous carbide layer with silicon metal.

Another object of the invention is to provide a method for coating large pieces and irregular shapes of graphite with layers of silicon carbide and silicon metal in which the precise amount of finely divided silicon to be applied in each step is first applied evenly to the surface of the graphite in such a manner that it adheres thereto prior to heating.

Further objects and advantages will become apparent upon examination of the following description and examples.

In the practice of the invention there is first provided a piece of graphite suitable for use in a particular environment, e.g., a section of a moderator for a nuclear reactor having bores therein for the flow of a coolant fluid, or other components which in use are subject to high temperature attack or contact with corrosive fluids. It has been found that a number of grades of graphite can be utilized or otherwise coated satisfactorily. The two factors which appear to be most crucial are that the graphite be relatively isotropic, particularly with reference to coefficient of thermal expansion, and that the coefficient of thermal expansion (CTE) match that of silicon metal as closely as possible. Insufficient experimental data are available to establish conclusively how great a difference in expansion coefficients can be tolerated without coating failure. However, graphite which is isotropic within the limits indicated by the coefficient of thermal expansion within the range of 3 to $8 \times 10^{-6}$ in./in./° C., as compared with the value of $4.2 \times 10^{-6}$ for silicon metal, has been found completely satisfactory.

In addition, the process of the invention requires that the graphite be only partially permeable to molten silicon; this requires the use of very dense grades of graphite, since excessive penetration of silicon metal into the graphite base results from the use of less dense grades. Table I contains a listing of several graphite grades available along with some of their properties and comments upon the coatings obtained using these grades of graphite.

Du Pont Hyperfine grade III silicon has been found satisfactory. Less refined grades of silicon containing only 98% Si were found to contain too much oxide and to produce in slag deposits on the surface of the coat. A grade of intermediate purity would no doubt also be acceptable.

TABLE I

| Manufacturer | Mfgr.'s Code | Density (g./cc.) | Coeff. of Therm. Expansion (in./in., ° C.) Direction with respect Molding Force | | Results |
|---|---|---|---|---|---|
| | | | Parallel | Perpendicular | |
| Great Lakes | A | 1.75 | $7.5 \times 10^{-6}$ | $6.5 \times 10^{-6}$ | Extreme penetration; however, several pieces had excellent lifetimes. |
| Do | A | 1.83 | Same as above; CTE varied little with density. | | Satisfactory. |
| Do | A | 1.91 | Same as above | | Do. |
| Do | BP | 1.75 | $5.2 \times 10^{-6}$ (0–1000° C.) | $3.3 \times 10^{-6}$ | Excessive penetration. Piece was grossly deformed. |
| Do | P | 1.72 | $5.2 \times 10^{-6}$ (0–800° C.) | $3.8 \times 10^{-6}$ | Behaved similar to BP grade. |
| Do | P | 1.93 | Same as grade P above | | Very satisfactory coats obtained. |
| Graphite Specialties Corp | G | 1.75 | Not known | | Coats went on very well and looked satisfactory. All developed cracks after about 100 hr. testing in two dimensions, presumably owing to mismatch of coeff. of expansion. |
| Nat'l Carbon, density increased by Graphite Specialties Corp. | AGOT | 1.80 | $4.35 \times 10^{-6}$ (100–1000° C) | $3.24 \times 10^{-6}$ | Very satisfactory. |
| National Carbon | ATJ | 1.73 | $4.9 \times 10^{-6}$ | $4.0 \times 10^{-6}$ | Variable. A few pieces were satisfactory; most exhibited excessive penetration. |
| National Carbon (Experimental grade). | RT-003 | 1.85 | Not known | | Coat went on well, but cracks developed. Flaws suspected rather than mis-match in CTF. |

As an initial step in the process of producing the coating, the graphite piece to be coated must be degassed. This is necessary because it has been observed that virtually all commercial grades of graphite contain volatiles which are given off during the coating process and which, if not removed previously, cause the coatings to be imperfect. Satisfactory results have been obtained by baking the graphite at 2000–2200° C. while maintaining a vacuum pressure of approximately $10^{-4}$ mm. Hg for one hour. Degassing may be undertaken at any time prior to the initial coating step.

Uniform wetting of the graphite by molten silicon during the initial coating step is improved if the surface of the graphite is "freshened" or slightly roughened. This may be accomplished by a short initial oxidation step in which the surface layer of graphite is removed, being converted to carbon dioxide. The quantity of silicon absorbed during the first application step is also somewhat more closely controllable when the surface is previously roughened. Specifically, in practice, depending upon the grade of the graphite, the roughening is accomplished by heating the graphite piece in still air at 1300° C. for 1–7 minutes. Obviously, the time and temperature may be adjusted to obtain the desired result, and in general a weight loss of 3–20 mg./cm.$^2$ is indicative of the desired change in surface activity.

If desired, degassing at room temperature may be again undertaken following oxidation, although limited contact to air following the initial degassing does not produce significantly deleterious effects.

The degassed, oxidized graphite is next coated with an even, penetrant layer of silicon carbide, preferably at least 50 mil in depth. The coating methods known in the prior art are generally satisfactory. However, in the preferred embodiment, adapted primarily to the coating of all surfaces of a single piece in a single application, the piece to be coated is disposed to rest upon a double knife-edged graphite support, and a weighed quantity of crushed silicon metal is placed upon the top surface. The quantity of silicon metal to be added per unit area is strongly dependent upon both the grade of graphite and the severity of the initial oxidation step, and is best determined by experiment. Usually a 25 percent excess over the quantity of silicon desired for the base coat is added, since the amount of silicon absorbed is not precisely predictable, and any excess metal will run off onto the support structure and cause no difficulty. The sample and support are then placed, or are retained in the event the graphite was oxidized in the same furnace, in a vacuum furnace capable of maintaining temperatures above 2000° C. The assembly is then evacuated to a pressure of about $10^{-4}$ mm. Hg and the temperature is quickly raised to 1500° C., at which temperature the silicon melts and flows over all surfaces of the graphite.

The excess silicon runs off the graphite knife edges. When most of the free silicon has disappeared, as indicated by the disappearance of the shinning, metallic appearance, the temperature is raised to 1900° C. under the same vacuum conditions, and the heating is continued for at least 30 minutes. This heating results in complete removal of the free silicon metal from the surface of the graphite, since under these conditions both the reaction to form solid SiC and the vaporization of silicon to $Si_{(g)}$ are rapid. The result is a porous, penetrant layer of SiC, or more correctly a mixture of SiC and graphite, extending in from the surfaces for as much as 50 mils, and having virtually no protective value against oxidation. It is believed that the molten silicon intrudes into the "caves" and "tunnels" of the graphite, and in so doing forms a sinuous and interlocking network of SiC. There is, however, a large fraction of the graphite left unreacted, which, too, is in the form of an interconnected network interlocking with that of the SiC.

The graphite is next removed by appropriate chemical solution or reaction from the region or layer in which the graphite forms interconnecting passages or tunnels with the silicon carbide, thus leaving behind a porous interconnected region which blends into a second region wherein the pores are filled with graphite. Care must be exercised, of course, not to remove so much graphite that the silicon carbide layer is completely undermined; in practice this can be readily accomplished by limiting the time of contact with the material which removes or otherwise reacts with the graphite. Experience has shown that removal of 12 to 24 mg. of carbon per cm.$^2$ is a requisite amount preparatory to the final coating step. In the preferred embodiment, this is done by placing a piece or pieces prepared as indicated above on a needle pointed, three-legged $Al_2O_3$ support within a furnace. The temperature is raised to 1375° C. in air and the temperature maintained until the desired amount of graphite is oxidized from the interconnecting passages. For a given graphite embodiment the exact time-temperature relationship must be determined by experiment. Once the time-temperature relationship is determined, the exact loss may be determined simply by weighing the piece.

In applying the final coating the graphite piece is placed on a needle-pointed graphite support and a weighed quantity of crushed silicon is placed on its top surface. The amount of silicon should for best results include an amount 10% in excess of the amount required to cover the surfaces with a uniform molten layer after the excess metal has run off the edges. This amount can be determined experimentally for particular surfaces, after which the amount may be calculated quite closely for other pieces of that configuration. When the piece is a large or irregular shape, the silicon should be distributed evenly over the surface. The furnace is then evacuated to less than $10^{-4}$ mm. Hg, and the temperature raised to 1450° C. As in the initial coating step, the molten silicon metal wets all surfaces of the piece completely. It is important that the heating be stopped when the excess silicon has drained from the surface. This point can be determined by watching the fillets of liquid silicon which are formed at the point of contact between the piece and the support. The disappearance of these fillets indicates that no gross excess of the metal remains. The sample is then cooled and removed from the furnace.

When extreme care is not exerecised to regulate the quantity of silicon metal remaining on the surface as discussed above, there is a tendency toward roughness in the final coating. The reason for this is that the silicon metal expands upon freezing, yielding "nibs" which render the coating quite rough. The severity of the roughness is a direct function of the amount of free silicon left on the surface, and undoubtedly can be reduced for many applications using less silicon for the final coat. In addition the surface may be ground smooth if desired, as with SiC paper and $CCl_4$.

In coating extremely large pieces, it may be desired to apply the silicon separately to several sides. Specifically, in the first or initial coating the crushed silicon is spread over a top surface which is then coated in the vacuum-heating step; the reverse side may then be turned upward, covered loosely with crushed silicon and vacuum-heated to complete the coating of areas onto which the initial covering did not extend. Carburization is then undertaken. The second coat may be similarly applied.

Alternatively, the precise amount of silicon in each of the coating steps may be applied in such a manner that an even coating of finely divided metal adheres to the exterior graphite until heating can be accomplished, at which time there is no run-off of excess metal. Lacquers containing finely divided metals in addition to thickeners, binders and other carbonaceous materials are generally known in the graphite coating arts. However, in the preferred embodiment, silicon metal of less than 50 micron mean particle diameter is suspended or slurried in acetone and the suspension is applied, e.g., painted, onto all graphite surfaces. Surfaces defining void spaces, e.g., tubes, are also conveniently coated by dipping or filling. Upon evaporation of the acetone the finely divided silicon surprisingly adheres closely to the graphite with a minimum of flaking. when such an adherent finely-divided silicon metal residue layer is applied, non-wettable supports may be used in the heating steps, e.g., alumina supports, for the reason that there is no run off of excess metal. During heating the surface tension forces tend to even out the coating so that attainment of evenness of the applied coating at all points is not a problem. Excellent results have been obtained coating both solid cylinders and cylinders with a plurality of longitudinal bores by this method in diameters up to about 5 inches.

*Example 1*

Approximately 40 samples of the better grades of graphite listed in Table I, i.e., Grades W, ATJ and W, were selected to be coated by the process of the invention. Each of the pieces was generally in the shape of a rectangular parallelepiped having dimensions of 3 cm. by 2 cm. by 2 cm. Several of the pieces were bored with cylindrical holes up to ⅜ in. in diameter. All pieces were roughened, degassed and oxidized as indicated hereinabove, i.e., each piece was heated for a period 1 to 7 minutes in still air at 1300° C. in order to roughen the surface thereof slightly, and degassed for one hour at a temperature in excess of 2000° C.

Each piece was next individually disposed face upward upon a knife edge support within a resistance furnace and a single pile of crushed silicon metal weighing one gram placed on top thereof. The furnace was evacuated to a pressure of $10^{-4}$ mm. Hg and the temperature was then raised to 1500° C. within about two to three minutes and thereafter maintained at this temperature for about two minutes. During this time the silicon metal distributed itself evenly over the entire surface of each side of the graphite; the temperature of the furnace was then raised to approximately 1900° C. and this temperature was maintained for about 20 minutes. During this time the vacuum pressure was not allowed to rise about $10^{-4}$ mm. Hg. The resulting coating of silicon carbide was found by measurement of selected specimens to have distributed itself uniformly over the entire outer graphite surface and to have penetrated inwardly for a maximum distance of about 50 mils.

The coated pieces were thereafter placed in an atmosphere of air at normal pressure, and heated to approximately 1375° C. for about 5 min., whereby graphite to a depth of about 25 mils was oxidized, as indicated by study of selected specimens. In the final step, the specimens were individually supported on needle-point graphite supports within a resistance heated furnace. One gram of crushed silicon metal was placed in a single pile thereon. The furnace was evacuated to $10^{-4}$ mm. Hg, and the specimens were heated to a temperature of approximately 1500° C. for about 5 minutes, i.e., only until the excess silicon had melted and drained from the surface.

After formation of the exterior coat, each piece was given a separate environmental test by exposing it in still air to a temperature of 1375° C. From the gain in weight, brought about by oxidation of the silicon, it appeared that in every instance, except where there was a gross failure of the coating as by a discontinuity or pinhole, the weight gain varied directly as the square root of time. This indicated that oxidation attack is limited by the rate of oxygen diffusion through the coat, since it is known that the rate of such diffusion is a function of the square root of time. Specimens which survived the first few hours of heating invariably did not fail before at least 500 hours of heating.

*Example 2*

A number of samples of reactor grade graphite were selected for coating in diameters of 4¼ inches or slightly less in some instances and about 2–2½ inches high. The smaller specimens each contained 127 longitudinal bores 0.2 inch in diameter 0.3 inch apart. Silicon metal powders of an estimated 20 microns mean particle diameter was weighed out and dispersed in a quantity of acetone sufficient to form a flowable slurry and calculated to cover all surfaces, in separate experiments for each specimen, with a uniform coating of 50–60 mg. per square centimeter. The slurry was brushed on and/or into the holes in each instance, and permitted to dry in place on alumina supports adapted for use within a resistance heated furnace. Except for the graphite and SiC coating steps the conditions and details of other steps of Experiment 1 were all complied with in each instance. No run-off was observed. Excellent results, comparable with those of the first Example, were obtained in each instance. Examination showed that both the SiC and silicon coatings contained about 30 mg. silicon per square centimeter, the excess silicon apparently being lost during application of the coating and by volatilization during heating.

While the invention has been disclosed with reference to several preferred embodiments, it will be apparent to those skilled in the art that numerous variations and modifications may be made within the scope and spirit of the invention and thus it is not intended to limit the invention except as defined in the following claims. For example, silicon metal may be applied to the work piece by suspending finely powdered silicon in a suitable fluid vehicle, and spraying or brushing the suspension onto the work surface. This method of application is better suited for mass production. For certain other applications, dipping the graphite into a bath of molten silicon would provide the most practical means of applying the coating. Other variations are contemplated.

What is claimed is:

1. In a process for producing a high temperature oxidation resistant refractory coating on dense nuclear grade graphite having an isotropic coefficient of thermal expansion in the range of 3 to $8 \times 10^{-6}$ in./in./° C., the steps comprising applying substantially oxide-free silicon metal to said porous surface in limited quantities while maintained at an elevated temperature above the melting point of silicon to react therewith and produce thereon a composite layer of silicon carbide interpenetrated by localized residual graphite regions of said surface, removing exposed portions of said residual graphite regions from said carbide layer by contact with an oxidizing atmosphere at elevated temperatures to produce a porous exterior surface thereon, whereby said layer may serve as an intermediate bonding layer, and applying molten silicon metal to said porous exterior surface of said carbide layer to provide an adherent continuous layer of silicon metal coating bonded to the graphite by said intermediate carbide layer.

2. In a process for producing a high temperature oxidation resistant refractory coating on dense nuclear grade graphite having an isotropic coefficient of thermal expansion in the range of 3 to $8 \times 10^{-6}$ in./in./° C., the steps comprising subjecting said graphite to degassing and surface roughening treatments to provide a prepared surface thereon, said surface roughening treatment including heating said graphite in air at an elevated temperature to oxidize and remove irregular amounts of graphite leaving a porous surface, applying a limited quantity of substantially oxide-free silicon metal to said porous surface while maintained at an elevated temperature above the melting point of silicon to react therewith and produce thereon a composite layer of silicon carbide interpenetrated by localized residual graphite regions, contacting said composite layer on said graphite with an oxygen-containing gas at an elevated temperature to remove at least the exposed residual graphite regions to produce an exterior porous surface on said carbide layer, and applying molten silicon metal to said porous exterior surface of said carbide layer to provide an adherent continuous layer of silicon metal coating said exterior carbide surface and bonded to said graphite by the residual carbide layer.

3. The process as defined in claim 1 wherein said degassing treatment comprises heating said graphite to a temperature of above about 2000° C. in a vacuum of below about $10^{-4}$ mm. Hg for at least one hour.

4. The process as defined in claim 1 wherein said surface roughening treatment including heating said graphite in air at an elevated temperature to oxidize and remove of the order of 3 to 20 mg./cm.$^2$ of graphite, and wherein said degassing treatment comprises heating said graphite to a temperature of above about 2000° C., in a vacuum of below about $10^{-4}$ mm. Hg for at least one hour.

5. In a process for producing a high temperature oxidation resistant refractory coating on selected surfaces of an element fabricated from dense nuclear grade graphite having an isotropic coefficient of thermal expansion in the range of 3 to $8 \times 10^{-6}$ in./in./° C., the steps comprising subjecting said graphite element to surface roughening and degassing treatments to provide prepared selected surfaces on said element, said surface roughening treatment including heating said graphite in air at an elevated temperature to oxidize and remove irregular amounts of graphite leaving a porous surface, applying a limited quantity of substantially oxide-free silicon metal to said selected prepared surfaces while maintained at a temperature above the melting point of silicon and in a vacuum of below about $10^{-4}$ mm. Hg to react therewith and produce thereon a composite layer of silicon carbide interpenetrated by localized residual graphite regions, contacting said composite layer with an oxygen-containing gas at an elevated temperature to remove residual graphite from at least the exterior regions thereof whereby the carbide component remains as a porous exterior surface layer bonded to said graphite element, and applying silicon metal to said porous exterior surface layer at a temperature in the range of about 1450 to about 1500° C. and under a vacuum of below about $10^{-4}$ mm. Hg, whereby said silicon metal in a molten state spreads thereover and forms a continuous adherent layer of silicon metal coating said exterior porous carbide surface and is bonded to the graphite by said remaining composite porous carbide layer.

6. The process as defined in claim 5 wherein said surface roughening treatment comprises heating said graphite in air at an elevated temperature to oxidize and remove of the order of 3 to 20 mg./cm.$^2$ of graphite, and wherein said degassing treatment comprises heating said graphite to a temperature of above about 2000° C. in a vacuum of below about $10^{-4}$ mm. Hg for at least one hour.

7. The process as defined in claim 5 wherein said surface roughening treatment comprises heating said graphite in air at a temperature of about 1375° C. to oxidize and remove of the order of 3 to 20 mg./cm.$^2$ of graphite, and wherein said degassing treatment comprises heating said graphite to a temperature of above about 2000° C. in a vacuum of below about $10^{-4}$ mm. Hg for at least one hour.

8. The process as defined in claim 5 wherein said temperature at which the oxide-free silicon metal is applied to said selected prepared surfaces of the graphite elements comprises heating to about 1500° C. for a first maintenance period sufficient for the silicon metal to melt and cover said surfaces and heating thereafter to about 1900° C. for a second maintained period sufficient to complete the reaction to produce silicon carbide.

9. The process as defined in claim 5 wherein the amount of said silicon metal applied to said surfaces is sufficient to produce a carbide layer of about 50 mils in thickness, and wherein about 12 to 24 mg./cm.$^2$ of weight loss is produced during said operation of contacting the composite layer with an oxygen containing gas.

10. In a process for producing a high temperature oxidation resistant refractory coating on selected surfaces of an element fabricated from dense nuclear grade graphite having an isotropic coefficient of thermal expansion in the range of 3 to $8 \times 10^{-6}$ in./in./° C., the steps comprising subjecting said graphite element to surface roughening and degassing treatments to provide prepared selected surfaces on said element, said surface roughening treatment including heating said graphite in air at an elevated temperature to oxidize and remove irregular amounts of graphite leaving a porous surface, applying a limited quantity of substantially oxide-free silicon metal to said selected prepared surfaces while maintained at a temperature above the melting point of silicon and in a vacuum of below about $10^{-4}$ mm. Hg to react therewith and produce thereon a composite layer of silicon carbide interpenetrated by localized residual graphite regions, contacting said composite layer with an oxygen-containing gas at an elevated temperature to remove residual graphite from at least the exterior regions thereof whereby the carbide component remains as a porous exterior surface layer bonded to said graphite element, applying silicon metal to said porous exterior surface layer at a temperature in the range of about 1450 to about 1500° C. and under a vacuum of below about $10^{-4}$ mm. Hg, whereby said silicon metal in a molten state spreads thereover and forms a continuous adherent layer of silicon metal coating said exterior porous carbide surface and is bonded to the graphite by said remaining composite porous carbide layer, and heating said silicon metal coated surface in air at a temperature of up to about 1375° C., whereby the surface of said silicon metal is converted to an oxide of silicon.

11. In a process for producing a high temperature oxidation resistant refractory coating on selected surfaces of an element fabricated from dense nuclear grade graphite having an isotropic coefficient of thermal expansion in the range of 3 to $8 \times 10^{-6}$ in./in./° C., the steps comprising subjecting said graphite element to surface roughening and degassing treatments to provide prepared selected surfaces on said element, said surface roughening treatment including heating said graphite in air at an elevated temperature to oxidize and remove irregular amounts of graphite leaving a porous surface, disposing silicon metal particles upon at least one location of said selected prepared surfaces, heating said surface above the melting point of silicon and in a vacuum of below about $10^{-4}$ mm. Hg to react therewith and produce thereon a composite layer of silicon carbide interpenetrated by localized residual graphite regions, contacting said composite layer with an oxygen-containing gas at an elevated temperature to remove residual graphite from at least the exterior regions thereof whereby the carbide component remains as a porous exterior surface layer bonded to said graphite element, and applying silicon metal to said porous exterior surface layer at a temperature in the range of about 1450 to about 1500° C. and under a vacuum of below about $10^{-4}$ mm. Hg, whereby said silicon metal in a molten state spreads thereover and forms a continuous adherent layer of silicon metal coating said exterior porous carbide surface and is bonded to the graphite by said remaining composite carbide layer.

12. In a process for producing a high temperature oxidation resistant refractory coating on selected surfaces of an element fabricated from dense nuclear grade graphite having an isotropic coefficient of thermal expansion in the range of 3 to $8 \times 10^{-6}$ in./in./° C., the steps comprising subjecting said graphite element to surface roughening and degassing treatments to provide prepared selected surfaces on said element, said surface roughening treatment including heating said graphite in air at an elevated temperature to oxidize and remove irregular amounts of graphite leaving a porous surface, applying silicon metal of less than about 50 micron mean particle diameter slurried in acetone to said selected prepared surfaces to provide an adherent layer thereon, heating said surface above the melting point of silicon and in a vacuum of below about $10^{-4}$ mm. Hg to react therewith and produce thereon a composite layer of silicon carbide interpenetrated by localized residual graphite regions, contacting said composite layer with an oxygen-containing gas at an elevated temperature to remove residual graphite from at least the exterior regions thereof whereby the carbide component remains as a porous exterior surface layer bonded to said graphite element, and applying silicon metal to said porous exterior surface layer at a temperature in the range of about 1450 to about 1500° C. and under a vacuum of below about $10^{-4}$ mm. Hg, whereby said silicon metal in a molten state spreads thereover and forms a continuous adherent layer of silicon metal coating on said exterior porous carbide surface and is bonded to the graphite by said remaining composite carbide layer.

13. In a process for producing a high temperature oxidation resistant refractory coating on selected surfaces of an element fabricated from nuclear grade graphite having an isotropic coefficient of thermal expansion in the range of 3 to $8 \times 10^{-6}$ in./in./° C., the steps comprising degassing said graphite element by heating to a temperature of above about 2000° C. in a vacuum of below about $10^{-4}$ mm. Hg for at least one hour, heating said degassed graphite element in air to remove of the order of 3 to 20 mg. of graphite leaving a roughened fresh surface thereon, supporting said element upon graphite knife edges, applying silicon metal powder in a small excess quantity to at least one location on said fresh surface of said element, heating said element in a vacuum of below about $10^{-4}$ mm. Hg to a temperature of about 1500° C., whereby said silicon metal melts and flows to cover and react with at least said fresh surfaces of said element and the excess flows off upon said graphite knife edges, then heating said element to a temperature of about 1900° C. in said vacuum to complete the reaction of said silicon metal to produce a composite layer of silicon carbide interpenetrated with localized residual graphite regions, contacting said element with air at an elevated temperature to remove residual graphite regions from at least the exterior surfaces of said composite layer, whereby the carbide component remains as an exteriorly porous surface on said composite layer, and then applying a limited quantity of silicon metal to said porous composite layer surface at a temperature in the range of about 1450 to about 1500° C. in a vacuum of below about $10^{-4}$ mm. Hg, whereby said silicon metal melts and produces a continuous adherent layer of silicon metal coating said exterior porous carbide surface and is bonded to the graphite by the remaining composite carbide layer.

References Cited in the file of this patent

UNITED STATES PATENTS

| | | |
|---|---|---|
| 653,872 | Lynn | July 17, 1900 |
| 1,322,491 | King | Nov. 18, 1919 |
| 1,948,382 | Johnson | Feb. 20, 1934 |
| 2,597,963 | Winter | May 27, 1952 |
| 2,614,947 | Heyroth | Oct. 21, 1952 |
| 2,691,605 | Hediger | Oct. 12, 1954 |
| 2,822,301 | Alexander et al. | Feb. 4, 1958 |
| 2,848,352 | Noland et al. | Aug. 18, 1958 |
| 2,929,741 | Steinberg | Mar. 22, 1960 |
| 2,992,127 | Jones | July 11, 1961 |
| 3,019,128 | Smiley | Jan. 30, 1962 |
| 3,035,325 | Nicholson et al. | May 22, 1962 |

OTHER REFERENCES

Blocker et al.: "BMI-1349, Coating of Graphite With Silicon Carbide by Reaction With Vapor of Controlled Silicon Activity," June 15, 1959, Battelle Memorial Institute, Columbus, Ohio.